(12) United States Patent
St. Pierre (10) Patent No.: US 7,526,797 B2
(45) Date of Patent: Apr. 28, 2009

(54) SYSTEM AND METHOD FOR PROCESSING CALLBACK REQUESTS INCLUDED IN WEB-BASED PROCEDURE CALLS THROUGH A FIREWALL

(75) Inventor: Robert P. St. Pierre, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 548 days.

(21) Appl. No.: 10/202,708

(22) Filed: Jul. 24, 2002

(65) Prior Publication Data

US 2004/0019804 A1    Jan. 29, 2004

(51) Int. Cl.
G06F 7/04 (2006.01)
G06F 15/16 (2006.01)
G06F 15/177 (2006.01)
H04L 9/00 (2006.01)

(52) U.S. Cl. .............................. 726/5; 726/12; 713/153; 713/161; 713/168; 713/183; 709/203; 709/221

(58) Field of Classification Search ..................... 726/4, 726/11
See application file for complete search history.

(56) References Cited

U.S. PATENT DOCUMENTS

| | | | | |
|---|---|---|---|---|
| 5,606,663 | A * | 2/1997 | Kadooka | 726/18 |
| 5,682,475 | A * | 10/1997 | Johnson et al. | 726/18 |
| 5,915,087 | A * | 6/1999 | Hammond et al. | 726/12 |
| 6,289,384 | B1 * | 9/2001 | Whipple et al. | 709/229 |
| 6,477,708 | B1 * | 11/2002 | Sawa | 725/116 |
| 6,654,815 | B1 * | 11/2003 | Goss et al. | 709/248 |
| 6,951,023 | B2 * | 9/2005 | Bouat et al. | 719/328 |
| 6,952,731 | B2 * | 10/2005 | Picca et al. | 709/225 |
| 2004/0019682 | A1 * | 1/2004 | St. Pierre | 709/227 |
| 2007/0157297 | A1 * | 7/2007 | Patrick | 726/6 |
| 2008/0125961 | A1 * | 5/2008 | Lim | 715/205 |
| 2008/0175174 | A1 * | 7/2008 | Altberg et al. | 370/259 |

FOREIGN PATENT DOCUMENTS

| | | |
|---|---|---|
| EP | 1083730 A2 * | 3/2001 |
| EP | 1124394 A1 * | 8/2001 |
| WO | WO 2007066994 A1 * | 6/2007 |

OTHER PUBLICATIONS

Snyder, Robin, A Method Using Procedural Parameters and Callback Functions to Create A Generic Exchange-Sorting Module, 2001, ACM, pp. 136-144.*
Zaharioudakis et al, Adaptive, Fine-Grained Sharing in a Client-Server OODBMS: A Callback-Based Approach, 1997, ACM, pp. 570-627.*
Sashidhar et al, Design and implementation issues for supporting callback procedures in RPC-based distributed software, 1997, IEEE, pp. 460-466.*
Qian et al, Asynchronous Callback in Web Services, 2006, IEEE, pp. 375-380.*

* cited by examiner

Primary Examiner—Christopher A Revak
Assistant Examiner—Aravind K Moorthy
(74) Attorney, Agent, or Firm—Sonnenschein Nath & Rosenthal LLP (57) ABSTRACT

A method of processing callback requests included in web procedure calls through a firewall is discussed. A requesting device contacts a receiving device and requests the performance of a procedure. The procedure call includes a callback request that includes a destination address and port on the requesting device, as well as the address of a broker device. The receiving device parses the procedure call and identifies the requested service and the callback request and then terminates the connection with the requesting device. The receiving device executes the procedure and then requests a new connection to the broker device once the results of the requested service are obtained. The broker verifies the identity of the device and establishes a connection with the receiving device. The receiving device then transmits the results of the requested procedure to the broker which then forwards the results to the requesting device.

16 Claims, 5 Drawing Sheets

SYSTEM AND METHOD FOR PROCESSING CALLBACK REQUESTS INCLUDED IN WEB-BASED PROCEDURE CALLS THROUGH A FIREWALL

FIELD OF THE INVENTION

The illustrative embodiment of the present invention relates generally to web-based procedure calls and more particularly to processing web-based procedure calls containing callback requests through a fireball.

RELATED APPLICATIONS

The illustrative embodiment of the present invention is related to four co-pending applications, A System and Method For Processing Call back Requests Included in Web-Based Procedure Calls, A System and Method for Forward Chaining Web-Based Procedure Calls, MIME Encoding of Values for Web Procedure Calls, and System and Method for Dynamically Routing Web Procedure Calls filed concurrently with the present application.

BACKGROUND

Transport protocols enable distributed devices on a network to request services from remote devices. In a typical scenario, a requesting device sends a request or procedure call through a corporate or personal fireball and over a network to a receiving server via a transport protocol such as the Hyper Text Transport Protocol (HTTP). The transport protocols are connection-based and require a connection to remain open between the requesting device and the receiving server until the requested action has been performed and the response returned to the requesting device.

The use of transport protocols works very well for simple requests (i.e.: a request that does not take very long to handle) and for situations where the number of requesting devices is limited. Socket connections are established and terminated quickly for simple requests. Requests or procedure calls which take longer to execute do not degrade system performance significantly if they occur in limited numbers.

Unfortunately, the conventional use of transport protocols does not handle time-intensive procedure requests from large numbers of requesting devices well. The requirement of keeping the connection open between the requesting device and the receiving device represents a major resource drain for the receiving device which can quickly exhaust the number of available connections. The absence of available connections prevents additional devices from accessing the receiving device. If the receiving device attempts to drop the connection and later respond or callback the requesting device over a new connection, the fireball prevents access to the requesting device.

SUMMARY OF THE INVENTION

The illustrative embodiment of the present invention provides a method of processing callback requests included in web procedure calls through a fireball. A web procedure call is a procedure call made over a network to a server or other electronic device. The procedure call includes the name of the procedure, and alternately one or more parameters required for the execution of the procedure. A requesting device contacts a receiving device and requests the performance of a procedure. The procedure call includes a callback request. The callback request includes a destination address and port on the requesting device, as well as the address of a broker device. The broker is authorized to access specified devices located behind the fireball. Also included in the request is a password for inclusion in a response to the broker. The receiving device parses the procedure call and identifies the requested service and the callback request. After identifying the callback request, the receiving device terminates the connection with the requesting device. The receiving device executes the procedure and then requests a new connection to the broker device once the results of the requested service are obtained. The new connection request utilizes the password included with the callback request. The broker verifies the the device and password on a list of registered callback devices and establishes a connection with the receiving device. After the connection is established, the receiving device transmits the results of the requested procedure to the the broker which then forwards the results to the requesting device.

In one embodiment, a connection is established over a network between a requesting electronic device and a receiving electronic device. The receiving electronic device receives a request from the requesting electronic device. The request is conveyed via a transport protocol and includes a callback request. The callback request includes a return destination on the requesting device. The callback request also includes the address of a broker device located behind a fireball with the requesting device. The broker device is authorized by the fireball to receive and send messages to specified devices. The receiving electronic device terminates the connection, and performs the procedure specified in the request. The receiving device sends a request for a new connection to the broker device utilizing the broker address included within the callback request. Following the establishment of the new connection, the receiving electronic device transmits the results of the requested operation over the new connection to the broker which then forwards the results to the requesting device using the return destination included in the callback request.

In another embodiment, a connection is established over a network between a requesting electronic device and a receiving electronic device. The requesting electronic device, which is inside a fireball, sends a request over the connection to the receiving device. The request utilizes a transport protocol and includes a callback request. The callback request includes a return destination on the requesting device, and the address of a broker device inside the fireball. The requesting electronic device establishes a new connection to the broker device upon receiving a request for a new connection from the broker device (which has been contacted by the receiving device with the return destination information). The requesting electronic device then receives the results of the requested operation from the broker, the broker having received the results over the new connection from the receiving device.

DETAILED DESCRIPTION

The illustrative embodiment of the present invention provides a method of utilizing transport protocols to provide bi-directional web procedure calls through a fireball. A callback request included with a web procedure call provides a destination address and port on the requesting device to be used for receiving results of the requested operation, as well as the address of a broker device. The broker device is authorized to receive messages from addresses outside the fireball and communicate with addresses inside the fireball. The utilization of a callback request included with a web procedure call enables a receiving device to terminate the original connection upon which it received the web procedure call while performing the requested procedure. In situations where the requested procedure takes an extended period of time or the receiving device is responding to a large number of requests, the ability to drop the original connection, perform the procedure, and respond to the requesting device via a new connection with the broker device saves resources on the receiving device. Replies to the request are sent to the requesting device utilizing the destination address and port included as a parameter in the callback request. Access to the receiving and requesting devices is increased as connections do not need to be held open.

Figure 1:
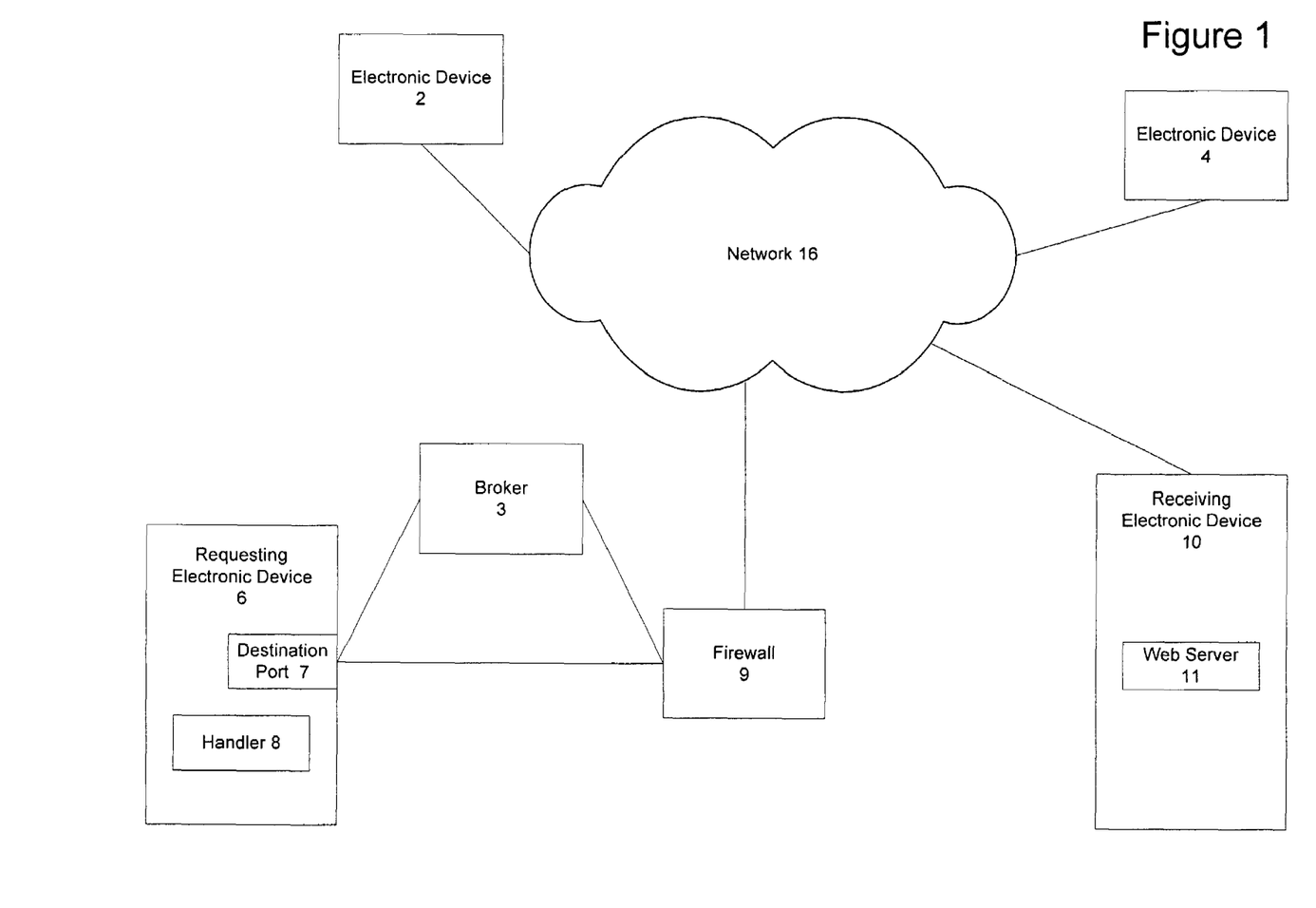
FIG. 1 depicts a block diagram of an environment suitable for practicing the illustrative embodiment of the present invention.

FIG. 1 depicts an environment suitable for practicing an illustrative embodiment of the present invention. A plurality of electronic devices 2, 4, 6, 10 are interfaced with a network 16. The electronic devices may each be a desktop computer, a workstation, a PDA, a server, a client device, a web server, or other electronic device with a microprocessor interfaced with the network 16. The network 16 may be the Internet, an extranet, an intranet, a wide area network (WAN), a metropolitan area network (MAN), a local area network (LAN), a satellite network, or some other type of network. A requesting electronic device 6 (requesting device) makes a web procedure call over the network 16 to a receiving device 10. The requesting device 6 accesses the network 16 through a fireball 9. The receiving device 10 includes a web server component 11. The web procedure call utilizes a transport protocol, such as HTTP, to submit a request and includes a callback request which specifies a destination address and port 7 on the requesting device 6 as well as the address of a broker device 3. Those skilled in the art will recognize that the broker device 3 may also be located outside of, or be part of, the fireball 9 without departing from the scope of the present invention. The requesting device 6 may include a handler 8 for receiving the results of the requested procedure from the receiving device 10. The electronic devices 2, 4, 6 and 10 may be arranged in a distributed client-server architecture with the server located outside the fireball, a peer-to-peer architecture or some other type of architecture.

The illustrative embodiment of the present invention provides a method of utilizing transport protocols that results in a more efficient use of resources on the receiving device. The transport protocol may be HTTP, FTP (File Transport Protocol) or some other type of transport protocol.

Figure 2:
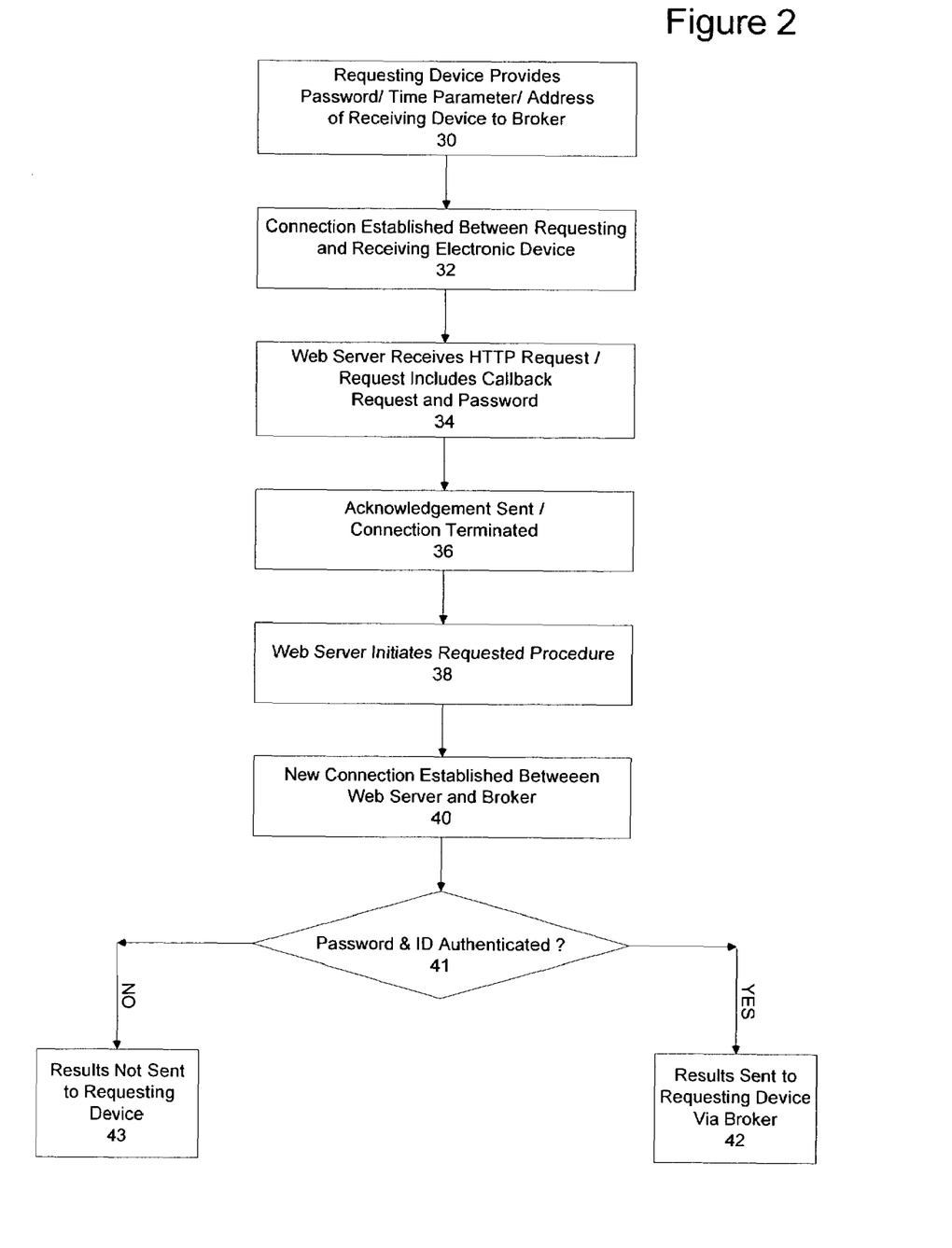
FIG. 2 is a flowchart of the sequence of steps performed by the requesting device to execute callback requests through a fireball.

FIG. 2 is a flowchart of the sequence of steps utilized by the illustrative embodiment of the present invention to execute callback requests. The sequence begins when the requesting device 6 provides a password, a time parameter controlling the length of time that the password remains valid, and the address of the receiving device 10 to the broker device 3 (step 30). The password, time parameter and receiving device address are added to a list of registered callback devices. A connection is established between the requesting electronic device 6 and the receiving electronic device 10 (step 32). A web procedure call is sent to the web server 11 on the receiving device 10 using HTTP over the newly established connection. The web procedure call has a callback request which includes the address of the broker device 3 and the password to use when contacting the broker device. The callback request functions as described in an application filed concurrently herewith entitled A System and Method For Processing Callback Requests Included in Web-Based Procedure Calls, the contents of which are hereby incorporated by reference. A web server is an electronic device, or portion of an electronic device, that delivers web pages to a requesting electronic device. The web server 11 on the receiving electronic device 10 parses the web procedure call and identifies the callback request (step 34). Since the web procedure call includes a callback request, the receiving electronic device sends an acknowledgement and terminates the original connection (step 36). The web server 11 initiates execution of the requested procedure (step 38). Those skilled in the art will recognize that the connection may be terminated after the requested procedure is initiated without departing from the scope of the present invention.

Once the procedure has been executed by the web server 11, the receiving device 10 requests the formation of a new connection with the broker device 3 (step 40). The connection request includes the password received from the requesting device. The broker device 3 compares the address of the receiving device and the password to the list of registered callback devices to determine their authenticity (step 41). If the receiving device is not on the list, or if the password is invalid, the connection is terminated and the receiving device is not allowed to forward the results of the requested operation to the requesting device via the broker (step 43). The password may be invalid because it is incorrect, or because the time parameter maintained by the broker 3 has expired. The broker 3 compares the the time parameter received from the requesting device to the time the password is submitted with the connection request. If the time parameter has been exceeded, the password is invalid. If the receiving device and the password are authenticated, the receiving device sends a new message containing the results of the requested operation to the broker over a new connection. The new message references the the earlier received destination port address on the requesting device 6. The broker forwards the message to the destination port on the requesting device 6 (step 42). Those skilled in the art will recognize that the illustrative embodiment may use alternate implementations other than a password to verify the identity of the receiving device. For example, the password may be omitted and only the address of the receiving address verified. Alternatively, the password may be a static password already known by the receiving device rather than a password submitted with the callback request.

In one embodiment, the web procedure call may be an HTTP GET, POST or PUT request. An HTTP GET request asks for the return of the referenced resource. A resource is a piece of information that can be identified by an URL (Uniform Resource Locator). The resource may be a file, a dynamically-generated query result, the output of a CGI script, or something else. An HTTP POST request is used to send data to a receiving device to be processed in some way, such as by a CGI script. A POST request differs from a GET request in that a block of data is sent with the request, in the message body. There are usually extra headers to describe this message body, like "Content-Type:" and "Content-Length:".

Additionally, a POST request URL does not represent a resource to retrieve, but rather is usually a program to handle the data sent with the request. The response to a POST request is usually program output, not a static file. The most common use of POST is to submit HTML form data to CGI scripts. An HTTP PUT request allows data to be uploaded from the requesting device 6 to the receiving device 10. Those skilled in the art will recognize that there are many other procedures in addition to GET, PUT and POST that may be specified with the callback request without departing from the scope of the present invention.

An example of the use of the callback request of the present invention is a request for information about a stock price. An HTTP request to GET a current stock price will ordinarily be satisfied right away over the original connection used to request the procedure. The URL for such a request would look similar to:

http://stock.guote.com/getQuote?symbol=SUNW where "stock.quote.com" represents the address of the receiving device, "getQuote?" is the requested operation, and "SUNW" represents the stock symbol of the company. However, a request to GET an entire stock price history will ordinarily take a long time to fulfill. The illustrative embodiment of the present invention adds a callback request to the GET request so that the receiving device can respond without having to hold open the original connection and yet still make contact with the requesting device 6 through the fireball 9. A callback request taking place in the absence of a fireball adds the following information to the URL so that it appears as:

http://stock.quote.com/getQuote?symbol=
SUNW&callback=http://client.myorg.org:6262

The callback request is appended to the end of the URL and indicates that the response to the web procedure call should be sent to the requesting device "client.myorg.org" at a destination port of 6262. The requesting device will listen at port 6262 for a request for a new connection request from the receiving device. The specified port may be the standard web server port 80 or an alternate port number as in the above example. Following the identification of the callback request, the original connection is terminated. By enabling the termination of the original connection, the receiving device can accept additional connections while responding to the GET request. The receiving device parses the procedure call and identifies the request/procedure (GET) and the callback command. Definitions of the procedures and the callback commands are contained in software libraries programmatically consulted by the receiving device at the time of parsing the request.

The presence of the fireball 9 adds additional information to the web procedure call so that it appears as:

https://stock.quote.com/getQuote?symbol=
SUNW&callback=https://client.myorg.org:
6262&broker=broker.myorg.
org&secretxxxxxxxx&time=nnnn where the address of the broker device 3 (myorg.org) is included as well as the secret (xxxxxxxx) and time parameter (nnnn) controlling the validity of the password. The receiving device 10 requests a new connection to the broker device 3 at the address specified upon completing the requested procedure. The connection request to the broker includes the password and takes place within the time period specified by the time parameter. In one embodiment, the request and callback request are secure socket requests (i.e.: https as opposed to http) to provide security for the password. In another embodiment, one of the request and callback request is a secure sockets request and the other request is a non-secure sockets request. Alternatively, both requests may be non-secure sockets requests.

Figure 3:
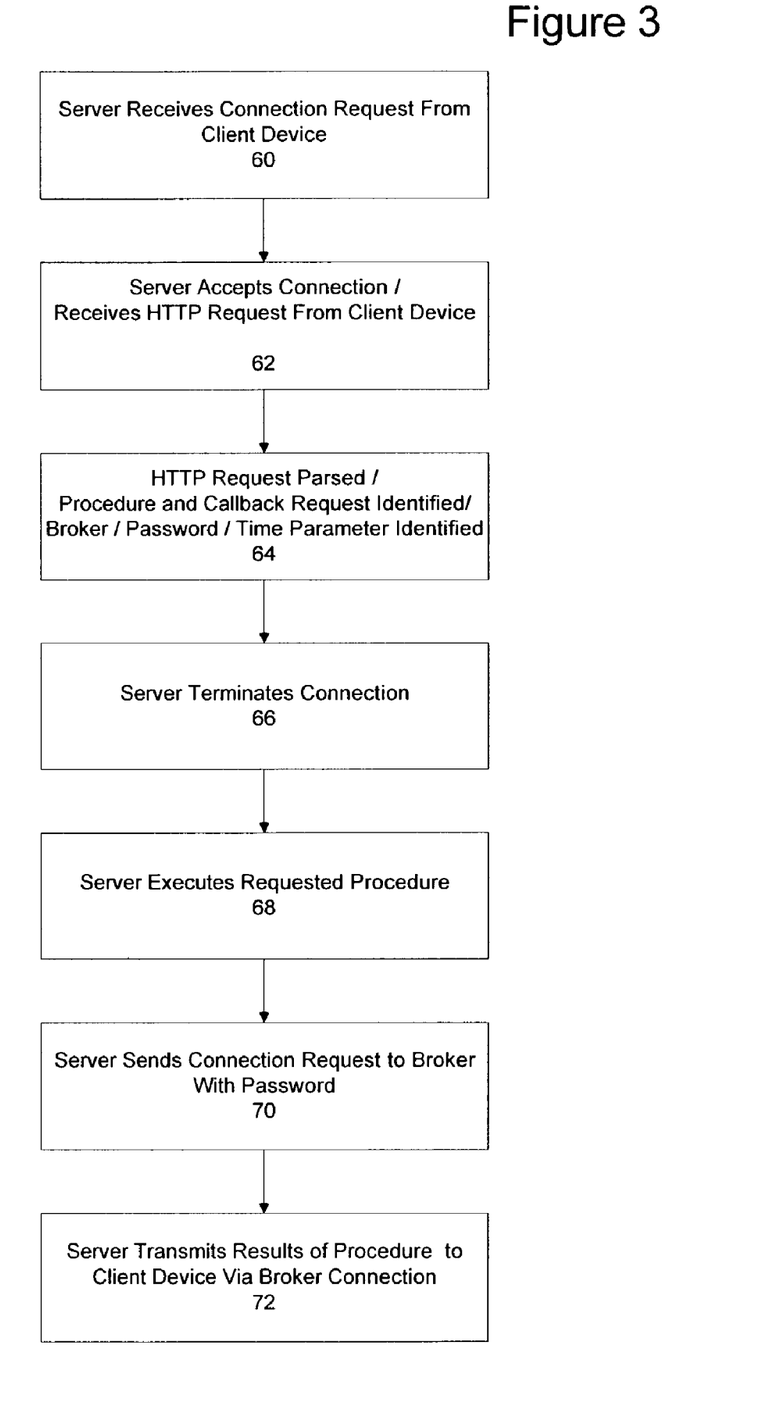
FIG. 3 is a flowchart of the sequence of steps performed by a server receiving an HTTP request with an included callback request from a device inside a fireball.

FIG. 3 is a flowchart of the sequence of steps performed by a web server 11 receiving an HTTP request with an included callback request from a requesting device inside a fireball. The sequence begins when the web server 11 receives a connection request from the requesting device 6 (step 60). The web server 11 accepts the connection and receives the HTTP request from the requesting device 6 over the connection (step 62). The web server 11 parses the HTTP request, extracts the commands from the HTTP request, and determines that the web procedure call includes a callback request. A broker address, password and time parameter are also identified (step 64). The original connection is broken to save server resources (step 66). The web server 11 initiates execution of the procedure requested in the HTTP request (step 68). Once the web server 11 has the results of the requested procedure, the web server requests a new connection to the specified broker device 3. The connection request is accompanied by the designated password (step 70). Once the new connection is established, the server transmits the results of the requested operation to the broker over the new connection which then forwards them to the designated port on the requesting device (step 72).

The connection between the broker device 3 and the requesting device 6 may be established by means of a connection request sent to a defined port. Networked electonic devices "listen" at defined ports for connection requests. Those skilled in the art will recognize that the port may be a well-known port traditionally used for certain types of services (i.e. the FTP Port) or may be a privately-defined port agreed upon in advance.

The requesting device 6 may create or designate a handler 8 specifically to receive the results of the callback request. The handler 8 is a logical address on the requesting device to which the results of the web procedure call are to be returned. The handler 8 is appended as an additional item to the callback request and is returned as a parameter when the receiving device 10 returns results of the web procedure call. For example, referring to the stock price example above, the requesting device 6 may create or designate the handler "history.php" to receive the results of the procedure call. The handler is appended to the callback request so that it appears as:

https://stock.quote.com/getQuote?symbol=
SUNW&callback=https://client.myorg.org:
6262/history.php&broker=broker.myorg.
org&secret=xxxxxxxx&time=nnnn When the response to the GET request is received at port 6262, the information is forwarded to the handler history.php. An alternative POST format for the same HTTP request would be:

https:/Hstock.quote.com/getQuote?symbol=SUNW with the body of the post containing:
callback=https://client.myorg.org:6262/history.php
broker broker.myorg.org
secret=xxxxxxxx
time=nnnn The POST format provides the same functionality but removes the limitation some services may impose upon the length of the URL.

Figure 4:
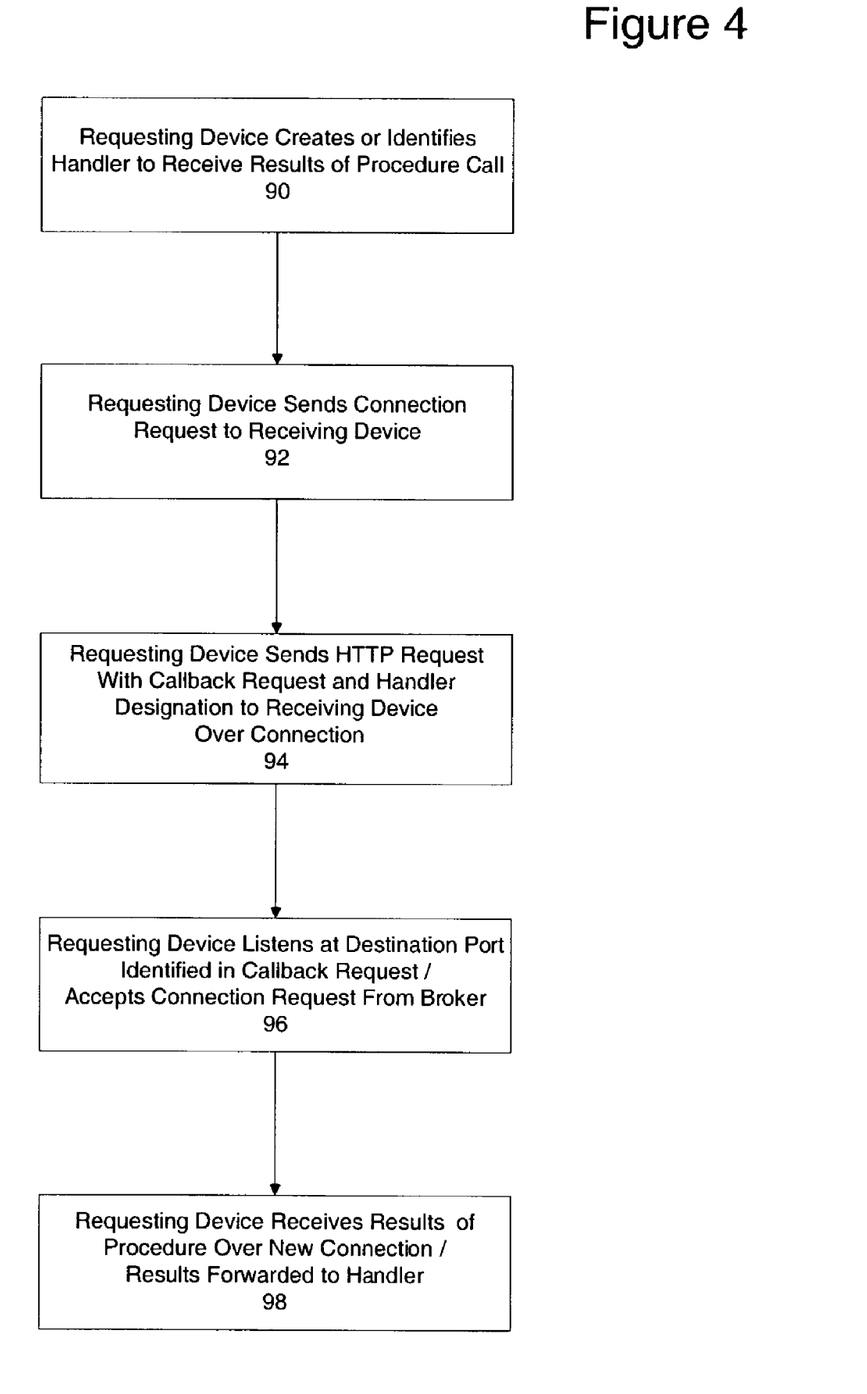
FIG. 4 is a flowchart of the sequence of steps performed by a requesting device to direct a callback request to a created handler inside a fireball.

FIG. 4 is a flowchart of the sequence of steps performed by a requesting device 6 to direct a callback request to a created (or designated) handler 8 in the illustrative embodiment of the present invention. The sequence begins when the requesting device 6 creates or identifies a handler 8 on the requesting device (step 90). The requesting device 6 then sends a connection request to the receiving device (step 92). The requesting device 6 sends an HTTP request to the receiving device which includes a callback request specifying a destination port and a local handler 8 on the requesting device (as well as the broker information noted above) (step 94). The requesting device 6 then listens on the destination port 7 for the broker device 3 to request a connection. When the broker device 3 requests a connection, the requesting device accepts the request and establishes the connection (step 96). The requesting device receives the results of the web procedure call over the connection from the broker and forwards the results to the handler 8 (step 98).

In one embodiment of the present invention, the request and the response may use different protocols. For example, the request may be made using HTTP and specify an FTP response in the callback request. Those skilled in the art will recognize that a number of different types of protocols for the requests and responses may be utilized without departing from the scope of the present invention.

Figure 5:
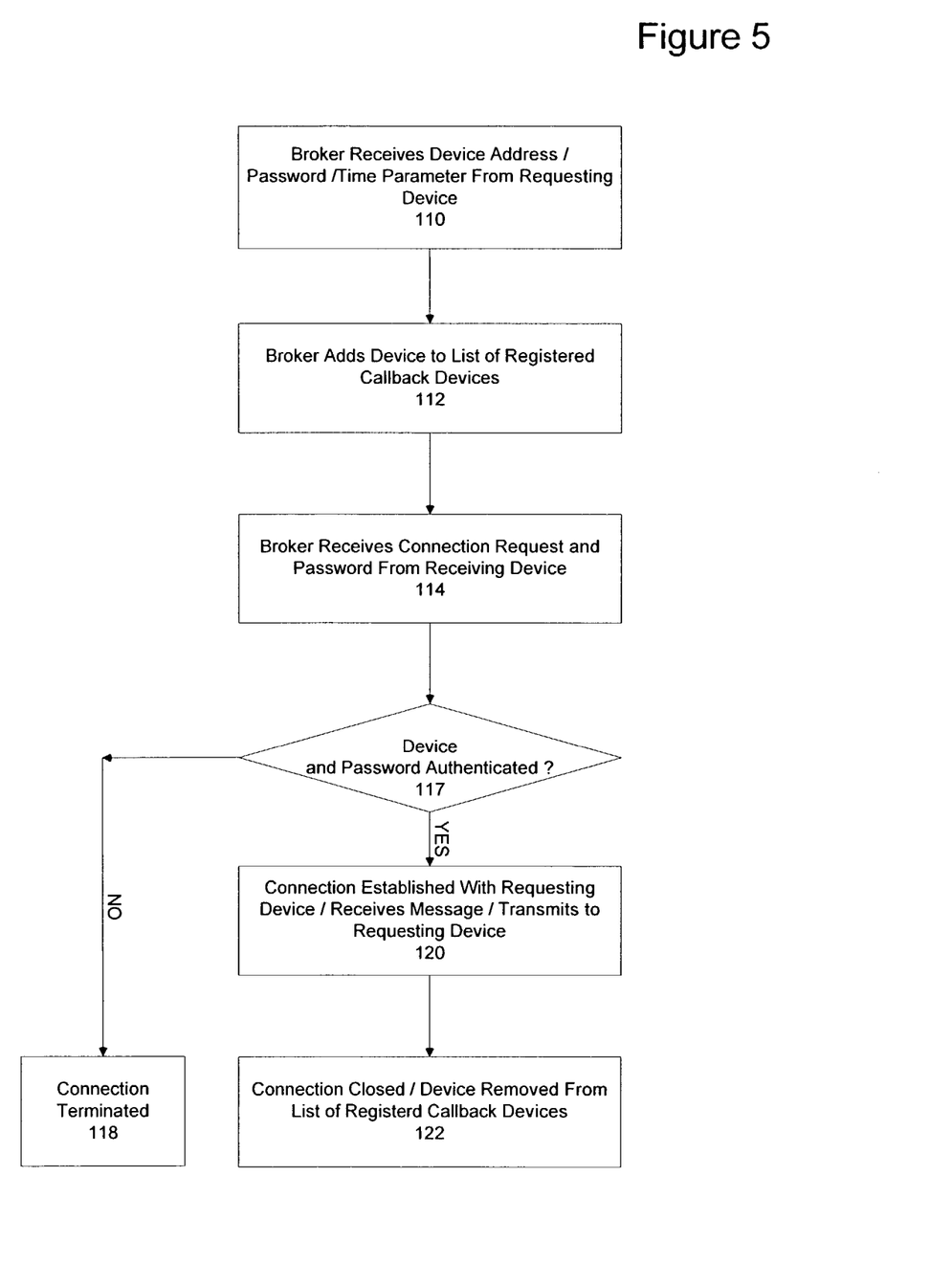
FIG. 5 is a flowchart of the sequence of steps performed by a broker device to register and verify a callback device.

The broker device 3 may be located on a DMZ (demilitarized) network behind the fireball 9. A DMZ network is a collection of devices providing a defined level of access between the Internet and a private network that allows devices outside the company network to access some but not all of the company network components. The sequence of steps performed by the broker device 3 in processing callback requests are depicted in FIG. 5. The sequence begins when the broker device receives a registration message specifying a device address, password and time parameter (specifying the length of time for which the password is valid) (step 110). The broker device 3 adds the specified device to a callback registration list (step 112). Subsequently, the broker receives a connection request and password from the receiving device 10 (step 114). The broker device 3 attempts to verify the receiving device address (which is part of the header of the connection request), and the password and time parameter against the values stored in the callback registration list (step 116). The broker device 3 determines (step 117) whether the receiving device is authorized to access the broker device based on the comparison of values. If the request is not validated, the connection is terminated (step 118). If the request is validated, the connection is established with the receiving device 10 and the broker device 3 receives a message over the connection from the receiving device 10. The broker device 3 then forwards the message which contains the results of the requested web procedure to the requesting device 6 (step 120). Following the transmission of the message from the broker device to the requesting device, the connection between the broker device 3 and the receiving device 10 is terminated and the receiving device is removed from the list of registered callback devices (step 122). Those skilled in the art will recognize, that the callback registration process may specify that the broker device allow multiple connection requests from the receiving device prior to removing the device from the registered callback list. The number of connections allowed may be specified as an additional parameter in the registration message.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. In a network having a plurality of interfaced electronic devices, said interfaced electronic devices including a requesting device and a receiving device, said requesting device accessing said receiving device from behind a firewall, a method, comprising the steps of:

receiving over a connection at said receiving device a request from said requesting device, said request including a callback request, said callback request including a return destination on the requesting device and the address of a broker, said broker being an electronic device authorized to contact the requesting device, and a password, said password being required to establish said connection with said broker;

dissolving said connection between said requesting device and receiving device;

performing an operation specified in said request;

establishing a new connection between said receiving device and said broker, said new connection utilizing the address of said broker included with said callback request;

transmitting said password to said broker as part of a connection request prior to establishing said new connection; and transmitting a message containing the results of said operation over said new connection to the broker, said message including the return destination on said requesting device.

2. The method of claim 1, comprising the further step of:

transmitting a pre-determined password to said broker as part of a connection request prior to establishing said new connection.

3. The method of claim 1, comprising the further step of: receiving in said callback request a uniform resource locator (URL) address for a handler on said requesting device, said handler designated to receive the results of said operation.

4. The method of claim 3, comprising the further step of:

including the address of said handler in the message containing the results of said operation.

5. The method of claim 1 comprising the further steps:

using the Hypertext Transfer Protocol (HTTP) to make said request; and including at least one of a PUT request, POST request, and GET request in said request.

6. The method of claim 1 wherein said results are transmitted in a protocol different from the protocol used in the request.

7. In a network having a plurality of interfaced electronic devices, said interfaced electronic devices including a requesting device and a receiving device, said requesting device separated from said network by a firewall, a method, comprising the steps of:

sending a message from said requesting device to a broker, said broker being an electronic device authorized to contact said requesting device, said message identifying the address of said receiving device as a future transmitter of data to said broker, wherein said message from the requesting device to said broker includes the designation of a password for inclusion by said receiving device in future messages to said broker;

sending a request from said requesting device over a connection to said receiving device, said request including a callback request, said callback request including a return destination on said requesting device and the address of said broker; and receiving the results of an operation specified in said request, said results transmitted from said broker, said broker transmitting said results received from said receiving device to said return destination on said requesting device.

8. The method of claim 7, comprising the further step of:
including a time parameter in said message from the requesting device to said broker, said time parameter limiting the validity of said password to a specified time period.

9. The method of claim 7 wherein said request is an HTTP request.

10. The method of claim 7 wherein said results are received in a protocol different from the protocol used to send the request.

11. The method of claim 7, comprising the further steps of:
creating a separate handler on said requesting device to receive the results of said operation, said handler having a unique uniform resource locator (URL) address;
including said UPI address in said callback request; and
receiving the results of said operation at said handler.

12. In a network having a plurality of interfaced electronic devices, said interfaced electronic devices including a requesting device and a receiving device, said requesting device separated from said network by a firewall, a method, comprising the steps of:
providing a broker, said broker being an electronic device authorized to contact said requesting device;
receiving a registration message with said broker from said requesting device, said registration message identifying the address of said receiving device as a future transmitter of data to said broker, wherein said registration message is accompanied by a password and time parameter to be used by the receiving device in future communications with said broker, said time parameter indicating the period of time for which said password remains valid;
establishing a connection between said broker device and said receiving device in response to a connection request from said receiving device; and
receiving a message with said broker over said connection, said message containing the results of an operation specified in a request transmitted from said requesting device to said receiving device, said message including a return destination on said requesting device.

13. The method of claim 12, comprising the further step of:
transmitting from said broker the message received from said receiving device to said destination port address.

14. The method of claim 12, comprising the further steps of:
receiving a password with said connection request;
comparing the time said password is received by said broker to said time parameter; and
establishing a connection between said receiving device and said broker based on said password being received within the time period specified by said time parameter.

15. The method of claim 12, comprising the further steps of:
receiving a password with said connection request;
comparing the time said password is received by said broker to said time parameter; and
refusing said connection request between said receiving device and said broker based on the expiration of said time parameter.

16. In a network having a plurality of interfaced electronic devices, said interfaced electronic devices including a requesting device and a receiving device, said requesting device accessing said receiving device through a firewall, a medium, said medium holding computer-executable steps for a method, said method comprising the steps of:
receiving over a connection at said receiving device a request from said requesting device, said request including a callback request, said callback request including a password a return destination on the requesting device and the address of a broker, said broker being an electronic device authorized to contact said requesting device;
dissolving said connection between said requesting device and receiving device;
performing an operation specified in said request;
establishing a new connection between said receiving device and said broker, said new connection utilizing the address of said broker included with said callback request;
including said password in a connection request sent to said broker to establish said new connection; and
transmitting a message containing the results of said operation over said new connection to the broker for subsequent forwarding to said requesting device, said message including the return destination on said requesting device.

* * * * *